United States Patent [19]
Gateau et al.

[11] Patent Number: 5,549,877
[45] Date of Patent: Aug. 27, 1996

[54] DEVICE AND PROCESS FOR MANUFACTURING SYNTHESIS GASES THROUGH COMBUSTION AND ITS APPLICATION

[75] Inventors: Paul Gateau, Saint Nom La Breteche; Michel Maute, Les Clayes Sous Bois; Alain Feugier, Orgeval, all of France

[73] Assignee: Institut Francais du Petrole, Rueil Malmaison, France

[21] Appl. No.: 544,371

[22] Filed: Jun. 27, 1990

[30] Foreign Application Priority Data

Jun. 27, 1989 [FR] France ................ 89 08667

[51] Int. Cl.$^6$ ................ B01J 7/00; B01J 12/00
[52] U.S. Cl. ........... 423/245.3; 423/650; 48/127.9; 48/198.1; 431/181; 422/129
[58] Field of Search ............. 423/415 A, 447.3, 423/650, 457, 458, 245.3; 60/740; 239/86, 426, 584; 252/373, 376; 48/127.1, 127.9, 198.1; 431/3, 32, 181, 187, 191; 422/129

[56] References Cited

U.S. PATENT DOCUMENTS

| | | | |
|---|---|---|---|
| 2,491,518 | 12/1949 | Riblett | 48/198.1 |
| 2,655,442 | 10/1953 | Mayland | 423/415 A |
| 3,768,955 | 10/1973 | McLaughlin | 431/12 |
| 3,969,842 | 7/1976 | Velie | 47/2 |
| 3,982,910 | 9/1976 | Houseman | 48/61 |
| 4,113,445 | 9/1978 | Gettert | 48/197 R |
| 4,294,814 | 10/1981 | Cheng | 423/457 |
| 4,464,108 | 8/1984 | Korenyi | 431/265 |
| 4,678,428 | 7/1987 | Tanaka | 431/76 |
| 4,752,303 | 6/1988 | Materne | 48/202 |
| 4,863,707 | 9/1989 | McShea, III | 423/359 |
| 5,066,421 | 11/1991 | Giacobbe | 252/373 |
| 5,087,270 | 2/1992 | Gateau et al. | 48/127.9 |

FOREIGN PATENT DOCUMENTS

| | | | |
|---|---|---|---|
| 59-116114 | 7/1984 | Japan | 423/415 A |
| 0880971 | 11/1981 | U.S.S.R. | 423/415 A |

Primary Examiner—Gary P. Straub
Assistant Examiner—Timothy C. Vanoy
Attorney, Agent, or Firm—Antonelli, Terry, Stout & Kraus

[57] ABSTRACT

The present invention relates to a device and a process for manufacturing synthesis gases through the combustion, under lack of oxygen, of a hydrocarbon fuel by use of a gaseous oxidizer, the device comprises primary injection means (2) producing, following an axis (14), a jet of fuel and of part of the oxidizer in a combustion chamber of a reactor, said jet comprising a main flame substantially originating at the level of the primary injection means (2) and extending from the primary injection means.

The device also includes secondary injection means for injecting a complementary amount of oxidizer into the combustion chamber, the secondary injection means being arranged to direct the complementary amount of oxidizer into the jet at a distance from the primary injection means.

21 Claims, 3 Drawing Sheets

DEVICE AND PROCESS FOR MANUFACTURING SYNTHESIS GASES THROUGH COMBUSTION AND ITS APPLICATION

BACKGROUND OF THE INVENTION

The present invention relates to a process and a device working by means of a flame for manufacturing a synthesis gas that can for example be used for preparing ammonia, or for manufacturing a reducing gas, particularly for the steel industry.

The ideal production of gas for the synthesis of ammonia is performed according to the following total reaction:

$$C_xH_y + x/2.O_2 + xH_2O \rightarrow xCO_2 + (2x+y)/2.H_2$$

A first method for producing synthesis gas with a good energy yield consists in associating a primary reforming with a secondary reforming.

In primary reforming, a strong overflash (molar ratio $H_2O/C>2$) the energy of which is recovered after the secondary reforming is introduced into a reactor comprising a catalyst.

In the secondary (catalytic) reforming, the effluents from the primary reforming are partly burnt while air is A second method for producing synthesis gas consists in burning in a reactor a fuel in an atmosphere with a lack of oxygen.

The combustion of hydrocarbons, such as methane generally stemming from natural gas, in an atmosphere with a lack of oxygen leads to the forming of carbon monoxide (CO), of hydrogen ($H_2$) which are the constituents of the synthesis gas, but also of carbon dioxide ($CO_2$), water ($H_2O$) and quite often of soot (C).

Soot notably appears when the lack of oxygen is too considerable. Still, since the yield in potential hydrogen increases, in a first approximation, with the combustion temperature and the lack of air or oxygen, the increase in hydrogen yield goes together with the forming of soot. The combustion temperature notably varies according to the preheating temperature of the fuel and the oxidizer.

Since this soot clogs the production equipments, which is not wished for, steam can be introduced into the reactor in order to prevent the forming of soot. The effluents can also be washed to remove the formed soot. In these two cases, the necessary material investment is very high.

Potential hydrogen means the amounts of hydrogen ($H_2$) and of carbon monoxide (CO) which are produced by the combustion. The carbon monoxide (CO) can be converted into hydrogen by shift conversion.

French Patent Application FR-2,608,581 describes a process and a device working by means of a flame for the manufacturing of synthesis gas. This process and the working of the device according to this invention, which avoids the presence of soot at the reactor outlet, consists in making the formed soot deposit on more or less deflecting walls located in the waste gas flow (effluents), then in oxidizing this soot by adding some oxidizer across the walls which are porous.

SUMMARY OF THE INVENTION

One object of the present invention is to decrease the potential amount of soot formed through the combustion in order to reduce the steam consumption, and thereby the necessary investment.

The invention proposes a device for manufacturing synthesis gas through the combustion, under lack of oxygen, e.g. oxidizer, of a hydrocarbon fuel with a gaseous oxidizer, the device comprising primary injection means producing, following an axis, a total jet of fuel and of part of the oxidizer in a combustion chamber of a reactor, the jet comprising a main flame substantially originating at the outlet level of the primary injection means and produced by the primary injection means.

The device is notably characterized in that it further comprises secondary injection means for injecting a complementary oxidizer, said secondary injection means being arranged to direct the complementary oxidizer across said jet, or into the center of the jet at a certain distance from said first primary injection means.

The secondary means can be placed across the jet at a distance from the primary means substantially at least equal to half of the distance which separates the primary injection means from the end of the main flame following the axis of the jet.

The distance separating the secondary means from the primary means can be at least equal to two thirds of the distance separating the primary means from the end of the main flame and preferably at least equal to the distance separating the primary means from the end of the main flame.

This corresponds in certain cases to a distance separating the secondary means from the primary means equal to at least half of the average diameter of the combustion chamber and preferably ranging from two to five times the average diameter. Average diameter means the term:

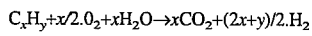

$$2\sqrt{\text{Average section of the chamber}/\pi}$$

The primary injection means or the secondary injection means will be able to introduce steam.

The primary oxidizer supply, defined as the number of moles of oxygen contained in the oxidizer injected through the primary means in relation to the number of moles of carbon contained in the fuel injected through the primary injection means, may range from 0.2 to 0.8 and preferably from 0.3 to 0.50.

The secondary oxidizer supply, defined as the number of moles of oxygen contained in the oxidizer injected through the secondary injection means in relation to the number of moles of carbon contained in the fuel injected through the primary injection means, may range from 0.1 to 0.8 and preferably from 0.1 to 0.5.

The oxidizer supply, defined as the number of moles of oxygen contained in the oxidizer injected through the primary injection means and the secondary injection means in relation to the number of moles of carbon contained in the fuel injected through the primary injection means may be substantially lower than 0.8 and, in a more preferred way, substantially lower than 0.6.

In these oxygen supply definitions, the number of moles of oxygen does not take into account the oxygen in the steam.

The secondary means may comprise oxidizer injectors located on a plane substantially perpendicular to said axis of the jet, of fuel and oxidizer introduced by the primary injection means at distances from said axis of the jet substantially equal.

The secondary injection means may comprise a succession of injectors which the oxidizer spurts out of, and which produce at least one secondary flame, and these injectors may be adapted for spreading the secondary flame.

The invention also proposes a process for manufacturing synthesis gas through the combustion, under lack of oxidizer, of a hydrocarbonated fuel by a gaseous oxidizer, the fuel and part of the comburent being injected under a form of a jet into a combustion chamber through primary injection means, the jet having an elongated axis and providing a main flame produced by the primary injection means and substantially originating at the outlet level of the primary injection means.

This process is notably characterized in that a complementary oxidizer is injected through secondary injection means located across said jet, the complementary oxidizer and the fuel forming at least one secondary flame, and in that secondary injection means adapted for spreading said secondary flame are utilized.

Secondary injection means adapted for lengthening the secondary flame following the axis of said jet may be utilized.

The device or the process according to the invention may be used for manufacturing a synthesis gas utilizable for manufacturing ammonia or for producing a reducing gas.

What is called the flame is the area where highly unstable chemical species such as free radicals ($OH^-$, $H^-$, $CH_3^-$, $O^-$ ...) or ions (($CxHy^+$, $H^+$) or molecules ($CHO$, $CH_2O$ ...) are to be found. Strong exothermic reactions take place in this area.

BRIEF DESCRIPTION OF THE DRAWINGS

The invention will be understood and its advantages will be clear from reading the description hereafter with reference to the accompanying drawings in which:

FIG. 1 represents a device with annular secondary means of injection comprising circumferential and coplanar injectors, FIG. 2 represents a device with cylindric secondary means of injection arranged at different levels of a main flame, and FIG. 3 represents a device with central secondary means of injection.

Figure 1:
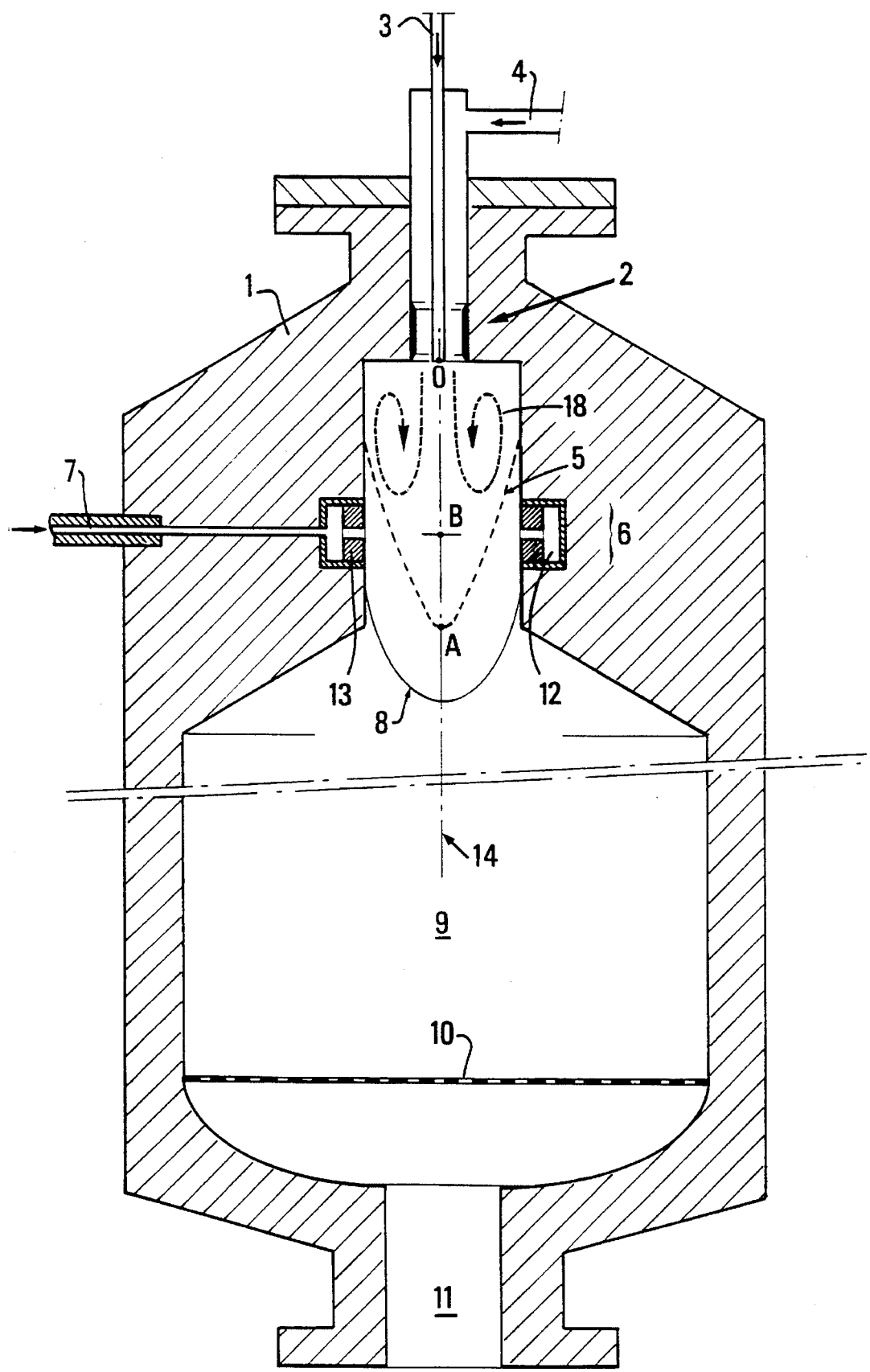
FIGS. 1, 2 and 3 show sections of various embodiments of the device according to the invention.

The elements that are identical for the three figures are referenced in the same way.

DESCRIPTION OF THE PREFERRED EMBODIMENTS

Reference 1 relates to the body of a device consisting of refractory materials surrounded by an envelope or jacket. The device or the reactor for manufacturing the synthesis gas is fed through primary injection means 2 for injecting an oxidizer and fuel which are generally located in the upper part of the reactor. The oxidizer is supplied through a duct 3 and the fuel is supplied through duct 4 to the primary injection means.

The primary injection means, when this means operates alone, produces a main flame 5 the outline or the end of which appears in dashed lines.

The secondary injection means are fed with oxidizer and possibly with part of the steam through duct 7.

When the secondary injection means 6 are working together with the primary injection means 2, the outline of the flame is referenced by solid line 8.

The combustion effluents then pass across a catalytic mass 9 held back by a gate or perforated support 10 before draining off through outlet 11. The catalytic mass 9 acts to speed up the endothermic conversion of methane with water. This conversion corresponds to the following reaction:

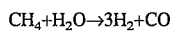

$$CH_4+H_2O \rightarrow 3H_2+CO$$

In FIG. 1, the secondary injection means 6 consist of an annular channel 12 fed with oxidizer and which in turn supplies an injection ring 13 fitted with holes arranged radially in relation to the axis 14 of the gas jet issuing from the outlet of duct 3 and the annular outlet of duct 4.

The secondary injection means are placed at a distance OB from the primary injection means which distance is substantially equal to two thirds of the distance OA separating the primary means from the end of the main flame 5.

Figure 2:
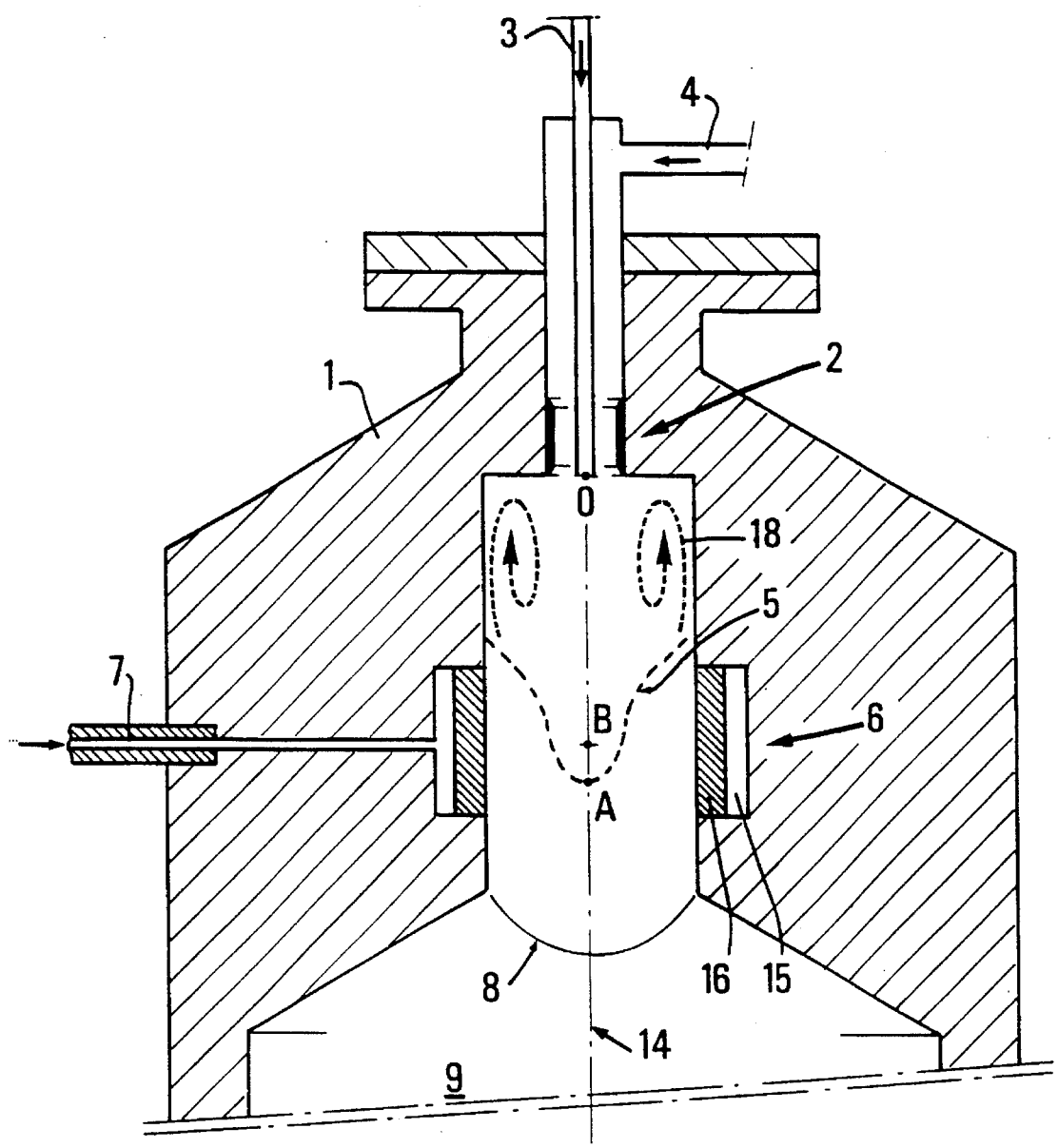

In FIG. 2, the secondary injection means 6 comprise an annular channel 15 and an oxidizer supply cylinder 16. This cylinder 16 is either made of a porous material or of a jacket perforated on its total height and circumference. The height and the position of cylinder 16 are adapted for the cylinder to be substantially on the limit of the edge of main flame 5 and for the transverse or horizontal axis of the secondary injection means to be located at a distance OB from the primary injection means ranging from the two thirds of the distance OA separating the primary injection means from the end of the flame following the axis of the jet to the distance OA separating the primary injection means from the end of the flame.

The porous material of cylinder 16 allows the passing through of the oxidizer or possibly of part of the steam while preventing the passing through of the unstable species produced by the combustion.

Figure 3:
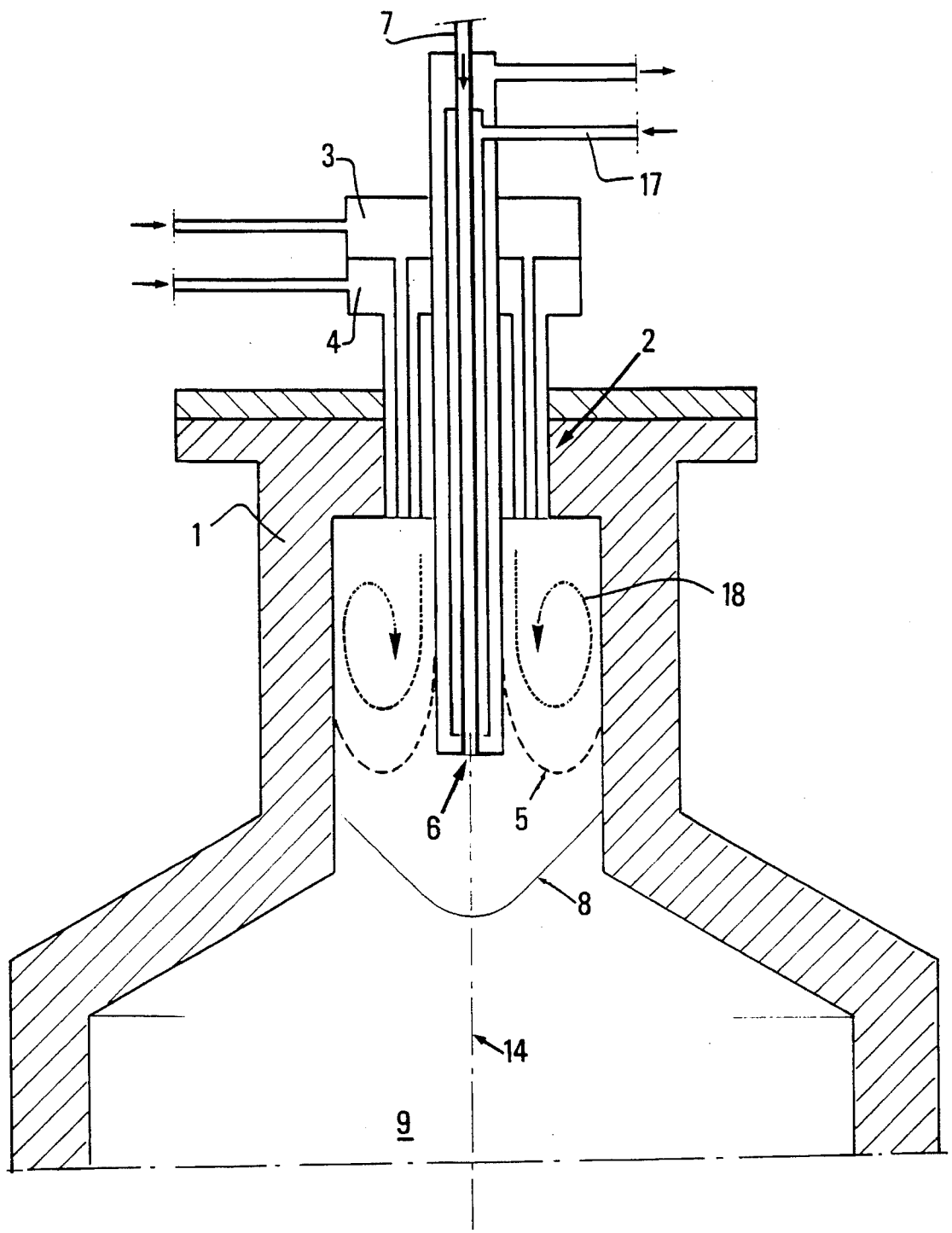

In FIG. 3, the secondary injection means is centrally located in relation to the axis 14 of the gas jet and arranged in the centre of the annular primary injection means 2.

These secondary means are cooled by a water circulation supplied through duct 17. In order to avoid this water circulation, such central means can be achieved with a refractory material like a ceramic based on silica and alumina such as mullite, or a ceramic based on silicon carbide.

The secondary injection means are substantially arranged at the same height as the end of main flame 5.

The adding of steam can be achieved either through the oxidizer duct, or through the fuel duct, or else through both together, or through the secondary injection means.

The oxidizer may be air or enriched air and may be mixed with steam, inert gases or carbon dioxide.

The fuel is a hydrocarbon which may be mixed with steam, inert gases, carbon dioxide or hydrogen. The fuel which is preferably utilized is methane.

The arrow heads [18] of FIGS. 1, 2 and 3 show the recirculation flows of materials present in the flame.

Tests have been carried out under 40.5 bars in a low-size unit (4 to 5 Nm3/h of natural gas) with a total $O_2/C$ ratio of 0.6.

Without stepping the combustion, the $H_2O/C$ ratio required for avoiding soot is 1.9. With a stepping, by introducing to the burner only a $O_2/C$ ratio of 0.46, the required ratio is 1.2. The complementary oxidizer i.e. a $O_2/C$ ratio of 0.14, is introduced afterwards. Over 30% steam is saved thereby.

We claim:

1. A device for manufacturing synthesis gas through the combustion, under a lack of oxygen, of a hydrocarbon fuel with a gaseous oxidizer, said device comprising a reactor having a combustion chamber and a primary injection means for producing a jet of the fuel and a portion of the oxidizer in the combustion chamber of the reactor, said jet having an elongated axis and forming a main flame substantially originating at an outlet level of the primary injection means and extending from the primary injection means along said axis and secondary injection means for injecting a complementary portion of the oxidizer into said combustion chamber, said secondary injection means being arranged to inject the complementary portion of oxidizer into said jet at a distance spaced from the outlet level of said primary injection means.

2. A device according to claim 1, wherein a plurality of outlets of said secondary injection means are arranged around said jet and along a wall portion defining an upper portion of said combustion chamber to inject the complementary portion of oxidizer across and transversely to the elongated axis of said jet.

3. A device according to claim 2, wherein the distance separating the plurality of outlets of the secondary injection means from the outlet level of said primary injection means is at least equal to the distance separating the outlet level of the primary injection means from the end of the main flame.

4. A device for manufacturing a synthesis gas through the combustion, under lack of oxygen of a hydrocarbon fuel with a gaseous oxidizer, said device comprising a reactor having a combustion chamber and primary injection means for producing at least one jet of the fuel and a portion of the oxidizer in the combustion chamber of the reactor, said at least one jet having an elongated axis and forming at least one main flame substantially originating at an outlet level of the primary injection means and extending from the primary injection means along said axis and secondary injection means for injecting a complementary portion of the oxidizer into said combustion chamber, said secondary injection means being arranged to inject the complementary portion of oxidizer into said at least one jet at a distance spaced from the outlet level of said primary injection means and to form a secondary flame spaced from the at least one main flame; a single outlet of said secondary injection means being arranged to extend into an upper portion of the combustion chamber to inject the complementary portion of oxidizer into a central portion of the at least one jet substantially along said elongated axis.

5. A device according to claim 4, wherein the primary injection means comprises an annular arrangement of discharge means for forming an annular main flame extending substantially parallel to said elongated axis and said single outlet of the secondary injection means is centrally located along said elongated axis to inject the complementary portion of oxidizer within said annular main flame.

6. A device according to claim 1, wherein a plurality of outlets of said secondary injection means is arranged to direct the complementary portion of oxidizer across said jet at a distance spaced from the outlet level of said primary injection means substantially at least equal to one half of a distance separating the outlet level of the primary injection means from an end of the main flame and extending along said elongated axis.

7. A device according to claim 6, wherein the distance separating the plurality of outlets of the secondary injection means from the outlet level of said primary injection means is at least equal to two thirds of the distance separating the outlet level of the primary injection means from the end of the main flame.

8. A device according to claim 1, wherein at least one of the primary injection means and the secondary injection means is provided with means for introducing steam into the combustion chamber.

9. A device according to claim 1, wherein the secondary injection means comprises a plurality of injectors located on a plane substantially perpendicular to the elongated axis of said jet, at distances from said axis which are substantially equal.

10. A device according to claim 1, wherein the secondary injection means comprises a succession of injectors from which the oxidizer discharges and which produces at least one secondary flame; said injectors being adapted to spread the at least one secondary flame about said main flame.

11. A device according to claim 1, wherein said secondary injection means is arranged to discharge the complementary amount of oxidizer across said elongated axis of the jet at a distance from the primary injection means at least equal to one half an average diameter of the combustion chamber.

12. A device according to claim 1, wherein said secondary injection means is arranged to discharge the complementary amount of oxidizer across said elongated axis of the jet at a distance from the primary injection means ranging from 2 to 5 times an average diameter of the combustion chamber.

13. A device according to claim 1, further comprising a catalytic mass arranged at an end of the combustion chamber for receiving combustion effluents and for speeding up an endothermic conversion of methane with water to produce hydrogen and carbon monoxide.

14. A device according to claim 1, wherein the primary injection means is located at an upper part of the reactor, said primary injection means comprising a plurality of ducts having a parallel axis and terminating on a same plane located at said outlet level, said secondary injection means having an outlet level vertically spaced from said outlet level of the primary injection means.

15. A process for manufacturing synthesis gas through the combustion, under a lack of oxygen, of a hydrocarbon fuel with a gaseous oxidizer which comprises injecting the fuel and a part of an oxidizer in the form of a jet having an elongated axis into a combustion chamber of reactor via a primary injection means, said jet forming a main flame originating substantially at an outlet level of the primary injection means and extending from the primary injection means, and injecting a complementary amount of oxidizer through at least one outlet of secondary injection means spaced from the outlet level of the primary injection means and located to direct a complementary amount of oxidizer into said jet, the complementary amount of oxidizer and the fuel forming at least one secondary flame spaced from the main flame.

16. A process according to claim 15, further comprising spreading said at least one secondary flame by injection of the complementary amount of oxidizer from said secondary injection means transversely to the elongated axis of said jet.

17. A process according to claim 15, further comprising lengthening said at least one secondary flame along the axis of said jet with said secondary injection means.

18. A process according to claim 15, wherein a primary oxidizer supply, provided by said primary injection means and defined as the number of moles of oxygen contained in the oxidizer injected through the primary injection means in relation to the number of moles of carbon contained in the fuel injected through the primary injection means, ranges from 0.2 to 0.8.

19. A process according to claim 15, wherein a secondary oxidizer supply, provided by said secondary injection means and defined as the number of moles of oxygen contained in the oxidizer injected through the secondary injection means in relation to the number of moles of carbon contained in the fuel injected through the primary injection means, ranges from 0.1 to 0.8.

20. A process according to claim 15, wherein an oxidizer supply, defined as the number of moles of oxygen contained in the oxidizer injected through the primary injection means and through the secondary injection means in relation to the number of moles of carbon contained in the fuel injected through the primary injection means, is substantially lower than 0.8.

21. A process according to claim 15, further comprising passing combustion effluents from said combustion chamber into a catalytic mass which acts to speed up an endothermic conversion of methane with water to produce hydrogen and carbon monoxide.

* * * * *